United States Patent
Martin et al.

(10) Patent No.: US 12,174,764 B2
(45) Date of Patent: Dec. 24, 2024

(54) ACTIVITY AND COMPRESSIBILITY BASED DATA COMPRESSION

(71) Applicant: Dell Products L.P., Round Rock, TX (US)

(72) Inventors: Owen Martin, Hopedale, MA (US); Ramesh Doddaiah, Westborough, MA (US)

( * ) Notice: Subject to any disclaimer, the term of this patent is extended or adjusted under 35 U.S.C. 154(b) by 0 days.

(21) Appl. No.: 18/143,137

(22) Filed: May 4, 2023

(65) Prior Publication Data

US 2024/0370391 A1 Nov. 7, 2024

(51) Int. Cl.
*G06F 13/20* (2006.01)

(52) U.S. Cl.
CPC .......... *G06F 13/20* (2013.01); *G06F 2213/40* (2013.01)

(58) Field of Classification Search
CPC .............................. G06F 13/20; G06F 2213/40
See application file for complete search history.

(56) References Cited

U.S. PATENT DOCUMENTS

| | | | | |
|---|---|---|---|---|
| 10,671,309 B1* | 6/2020 | Glynn | .................. | G06F 3/0683 |
| 11,989,436 B2* | 5/2024 | Varadan | .................. | G06F 3/061 |
| 12,001,338 B2* | 6/2024 | Jain | .................. | G06F 9/45558 |
| 2018/0196755 A1* | 7/2018 | Kusuno | ............... | G06F 12/0893 |
| 2019/0324916 A1* | 10/2019 | Armangau | .......... | G06F 12/0868 |

OTHER PUBLICATIONS

K. J. Balakrishnan and N. A. Touba, "Relationship Between Entropy and Test Data Compression," in IEEE Transactions on Computer-Aided Design of Integrated Circuits and Systems, vol. 26, No. 2, pp. 386-395, Feb. 2007, doi: 10.1109/TCAD.2006.882600. (Year: 2007).*

* cited by examiner

*Primary Examiner* — Eric T Oberly
(74) *Attorney, Agent, or Firm* — Krishnendu Gupta; Nikhil Patel

(57) ABSTRACT

One or more aspects of the present disclosure relate to increasing the performance of a storage array using activity and compressibility-based data compression. In embodiments, an input/output (IO) workload is received at a storage array. Additionally, at least one address space of at least one logical storage device with an IO activity corresponding to an activity characteristic and compressibility corresponding to a compressibility characteristic is identified. Further, if a data reduction requirement (DRR) of the storage array is unsatisfied, IO write requests of the IO workload targeting the identified address spaces of each logical device are compressed.

18 Claims, 5 Drawing Sheets

ACTIVITY AND COMPRESSIBILITY BASED DATA COMPRESSION

BACKGROUND

A storage array performs block-based, file-based, or object-based storage services. Rather than store data on a server, storage arrays can include multiple storage devices (e.g., drives) to store vast amounts of data. For example, a financial institution can use storage arrays to collect and store financial transactions from local banks and automated teller machines (ATMs) related to, e.g., bank account deposits/withdrawals. In addition, storage arrays can include a central management system (CMS) that manages the data and delivers one or more distributed storage services for an organization. The central management system can include one or more processors that perform data storage services.

SUMMARY

One or more aspects of the present disclosure relate to increasing the performance of a storage array using activity and compressibility-based data compression. In embodiments, an input/output (IO) workload is received at a storage array. Additionally, at least one address space of at least one logical storage device with an IO activity corresponding to an activity characteristic and compressibility corresponding to a compressibility characteristic is identified. Further, suppose the storage array's data reduction requirement (DRR) is unsatisfied. In that case, IO write requests of the IO workload targeting the identified address spaces of each logical device are compressed.

In embodiments, whether an observed DRR is greater than or less than the DRR can be determined. In addition, a dynamic compressibility threshold can be dynamically increased or decreased based on whether the observed DRR is greater than or less than the DRR.

In embodiments, the targets can be grouped according to their corresponding extents. For example, each extent can define a logical grouping of the address spaces of each logical storage device.

In embodiments, an IO activity of each extent can be monitored. Further, each extent can receive an IO activity score based on their respective IO activities.

In embodiments, an IO activity threshold can be dynamically established based on the IO activity scores of each extent.

In embodiments, a compressibility of each extent can be determined. Additionally, a compressibility entropy of each extent with a compressibility less than a dynamic compressibility threshold can be monitored.

In embodiments, monitoring the compressibility entropy of each extent can include compressing a sample of IO write requests targeting each extent with the compressibility less than a dynamic compressibility threshold.

In embodiments, a searchable compressibility data structure identifying each extent with a current compressibility less than the dynamic compressibility threshold can be maintained. In addition, a searchable activity score data structure identifying each extent with a current activity score exceeding a dynamic activity score threshold can be maintained.

In embodiments, at least one compressibility forecast for each extent can be generated based on their respective compressibility variations over time.

In embodiments, each IO write request targeting extents with a current IO activity score less than the IO activity threshold and a current compressibility greater than the dynamic compressibility threshold can be compressed. Additionally, each IO write request targeting extents with a current IO activity score greater than the IO activity threshold and a current compressibility greater than the dynamic compressibility threshold can be compressed if the DRR of the storage array is unsatisfied.

Other technical features may be readily apparent to one skilled in the art from the following figures, descriptions, and claims.

BRIEF DESCRIPTION OF THE DRAWINGS

The preceding and other objects, features, and advantages will be apparent from the following more particular description of the embodiments, as illustrated in the accompanying drawings. Like reference, characters refer to the same parts throughout the different views. The drawings are not necessarily to scale, emphasis instead being placed upon illustrating the embodiments' principles.

DETAILED DESCRIPTION

A business like a financial or technology corporation can produce large amounts of data and require sharing access to that data among several employees. Such a business often uses storage arrays to store and manage the data. Because a storage array can include multiple storage devices (e.g., hard-disk drives (HDDs) or solid-state drives (SSDs)), the business can scale (e.g., increase or decrease) and manage an array's storage capacity more efficiently than a server. In addition, the business can use a storage array to read/write data required by one or more business applications.

In some circumstances, a business can include a storage array with a total storage capacity less than the total size of data the business would like to store on the storage array. Businesses currently use naïve activity-based compression techniques to ensure all the data can be stored on the array. However, such techniques increase the storage array's total capacity by sacrificing performance. For example, current naïve activity-based compression techniques compress data based only on an activity level corresponding to the data's target address spaces. However, data generally HAs considerable variety in its compressibility. Thus, the current naïve activity-based compression techniques can unnecessarily consume significant storage array resources (e.g., logic, memory, and hardware) by attempting to compress low-reducible or irreducible data.

Embodiments of the present disclosure autonomously select address spaces with characteristics that maintain or enhance the storage array's performance. For example, the embodiments can compress data writes to address spaces with particular activity and compressibility characteristics that maintain or enhance the storage array's performance goal or data reduction requirement (DRR) storage array. For example, the address spaces can have activity and compressibility characteristics that consume storage array resources that do not degrade the storage array's performance described in greater detail herein.

Figure 1:
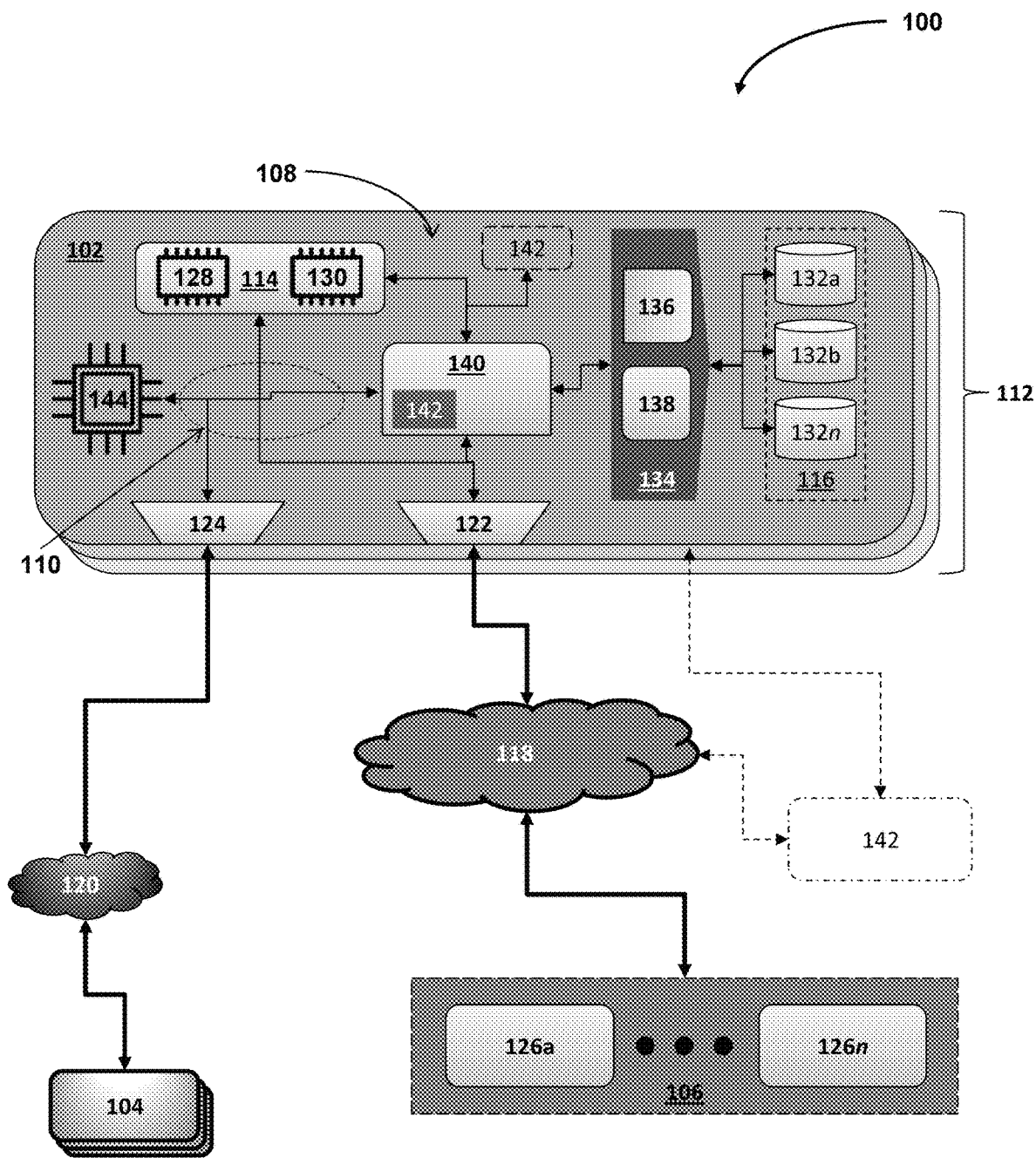
FIG. 1 illustrates a distributed network environment in accordance with embodiments of the present disclosure.

Regarding FIG. 1, a distributed network environment 100 can include a storage array 102, a remote system 104, and hosts 106. In embodiments, the storage array 102 can include components 108 that perform one or more distributed file storage services. In addition, the storage array 102 can include one or more internal communication channels 110 like Fibre channels, busses, and communication modules that communicatively couple the components 108. Further, the distributed network environment 100 can define an array cluster 112, including the storage array 102 and one or more other storage arrays.

In embodiments, the storage array 102, components 108, and remote system 104 can include a variety of proprietary or commercially available single or multi-processor systems (e.g., parallel processor systems). Single or multi-processor systems can include central processing units (CPUs), graphical processing units (GPUs), and the like. Additionally, the storage array 102, remote system 104, and hosts 106 can virtualize one or more of their respective physical computing resources (e.g., processors (not shown), memory 114, and persistent storage 116).

In embodiments, the storage array 102 and, e.g., one or more hosts 106 (e.g., networked devices) can establish a network 118. Similarly, the storage array 102 and a remote system 104 can establish a remote network 120. Further, the network 118 or the remote network 120 can have a network architecture that enables networked devices to send/receive electronic communications using a communications protocol. For example, the network architecture can define a storage area network (SAN), local area network (LAN), wide area network (WAN) (e.g., the Internet), an Explicit Congestion Notification (ECN), Enabled Ethernet network, and the like. Additionally, the communications protocol can include a Remote Direct Memory Access (RDMA), TCP, IP, TCP/IP protocol, SCSI, Fibre Channel, Remote Direct Memory Access (RDMA) over Converged Ethernet (ROCE) protocol, Internet Small Computer Systems Interface (iSCSI) protocol, NVMe-over-fabrics protocol (e.g., NVMe-over-ROCEv2 and NVMe-over-TCP), and the like.

Further, the storage array 102 can connect to the network 118 or remote network 120 using one or more network interfaces. The network interface can include a wired/wireless connection interface, bus, data link, and the like. For example, a host adapter (HA 122), e.g., a Fibre Channel Adapter (FA) and the like, can connect the storage array 102 to the network 118 (e.g., SAN). Further, the HA 122 can receive and direct IOs to one or more of the storage array's components 108, as described in greater detail herein.

Likewise, a remote adapter (RA 124) can connect the storage array 102 to the remote network 120. Further, the network 118 and remote network 120 can include communication mediums and nodes that link the networked devices. For example, communication mediums can include cables, telephone lines, radio waves, satellites, infrared light beams, etc. Additionally, the communication nodes can include switching equipment, phone lines, repeaters, multiplexers, and satellites. Further, the network 118 or remote network 120 can include a network bridge that enables cross-network communications between, e.g., the network 118 and remote network 120.

In embodiments, hosts 106 connected to the network 118 can include client machines 126a-n, running one or more applications. The applications can require one or more of the storage array's services. Accordingly, each application can send one or more input/output (IO) messages (e.g., a read/write request or other storage service-related request) to the storage array 102 over the network 118. Further, the IO messages can include metadata defining performance requirements according to a service level agreement (SLA) between hosts 106 and the storage array provider.

In embodiments, the storage array 102 can include a memory 114, such as volatile or nonvolatile memory. Further, volatile and nonvolatile memory can include random access memory (RAM), dynamic RAM (DRAM), static RAM (SRAM), and the like. Moreover, each memory type can have distinct performance characteristics (e.g., speed corresponding to reading/writing data). For instance, the types of memory can include register, shared, constant, user-defined, and the like. Furthermore, in embodiments, the memory 114 can include global memory (GM 128) that can cache IO messages and their respective data payloads. Additionally, the memory 114 can include local memory (LM 130) that stores instructions that the storage array's processors 144 can execute to perform one or more storage-related services. For example, the storage array 102 can have a multi-processor architecture that includes one or more CPUs (central processing units) and GPUs (graphical processing units).

In addition, the storage array 102 can deliver its distributed storage services using persistent storage 116. For example, the persistent storage 116 can include multiple thin-data devices (TDATs) such as persistent storage drives 132a-n. Further, each TDAT can have distinct performance capabilities (e.g., read/write speeds) like hard disk drives (HDDs) and solid-state drives (SSDs).

Further, the HA 122 can direct one or more IOs to an array component 108 based on their respective request types and metadata. In embodiments, the storage array 102 can include a device interface (DI 134) that manages access to the array's persistent storage 116. For example, the DI 134 can include a disk adapter (DA 136) (e.g., storage device controller), flash drive interface 138, and the like that control access to the array's persistent storage 116 (e.g., storage devices 132a-n).

Likewise, the storage array 102 can include an Enginuity Data Services processor (EDS 140) that can manage access to the array's memory 114. Further, the EDS 140 can perform one or more memory and storage self-optimizing operations (e.g., one or more machine learning techniques) that enable fast data access. Specifically, the operations can implement techniques that deliver performance, resource availability, data integrity services, and the like based on the SLA and the performance characteristics (e.g., read/write times) of the array's memory 114 and persistent storage 116.

In embodiments, the EDS 140 can deliver hosts 106 (e.g., client machines 126a-n) remote/distributed storage services by virtualizing the storage array's memory/storage resources (memory 114 and persistent storage 116, respectively). For example, the EDS 140 can establish a logical device (e.g., a virtual volume or thin device (TDEV)), virtualizing zero or more physical address spaces from, e.g., the persistent storage 116.

In embodiments, the storage array 102 can also include a controller 142 (e.g., management system controller) that can reside externally from or within the storage array 102 and one or more of its components 108. When external from the storage array 102, the controller 142 can communicate with the storage array 102 using any known communication connections. For example, the communications connections can include a serial port, parallel port, network interface card (e.g., Ethernet), etc. Further, the controller 142 can include logic/circuitry that performs one or more storage-related services. For example, the controller 142 can have an architecture designed to manage the storage array's computing, processing, storage, and memory resources as described in greater detail herein.

Figure 1A:
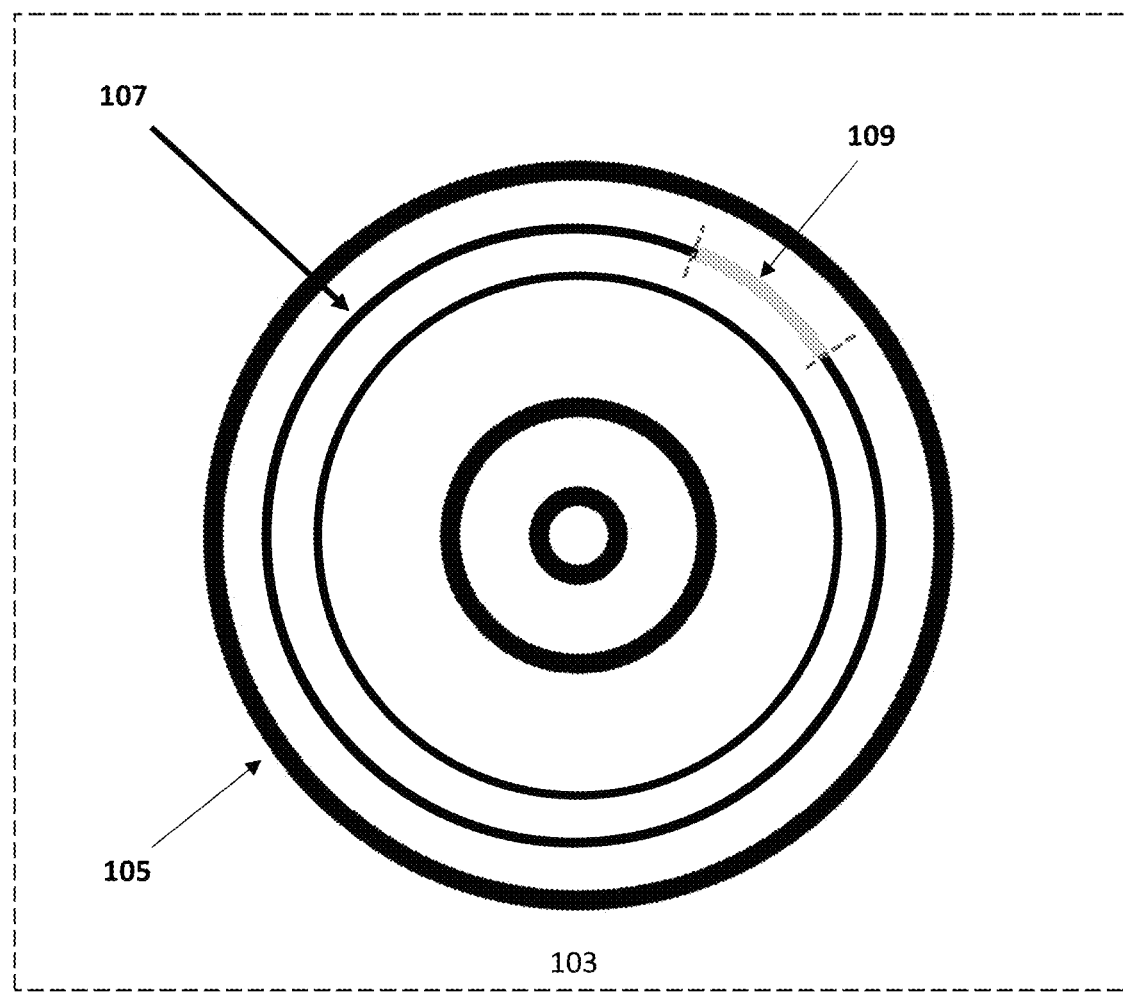
FIG. 1A is a cross-sectional view of a storage device in accordance with embodiments of the present disclosure.

Regarding FIG. 1A, the persistent storage 116 can include an HDD 103 with stacks of cylinders 105. Like a vinyl record's grooves, each cylinder 105 can include one or more tracks 107. Further, each track 206 can include a set of sectors (e.g., track slices or portions) 109. Additionally, each sector 1098 can include a set of physical address blocks.

In embodiments, the EDS can establish a logical block address (LBA) corresponding to each physical address block. Accordingly, a continuous set of LBAs can form a logical sector corresponding to a physical sector (e.g., sector 109 of a storage device 132a-n). Further, the EDS 140 can group several logical sectors to establish a logical track. Thus, a logical track can include physical address blocks from several storage devices 132a-n. Additionally, each logical track can include a unique identifier (ID), e.g., a track ID (TID). Thus, the EDS 140 can logically group one or more logical tracks using their respective TIDs to establish a logical device with a unique device ID. Furthermore, the EDS 140 can logically group a logical device's tracks to establish one or more extents with unique extent IDs.

Figure 2:
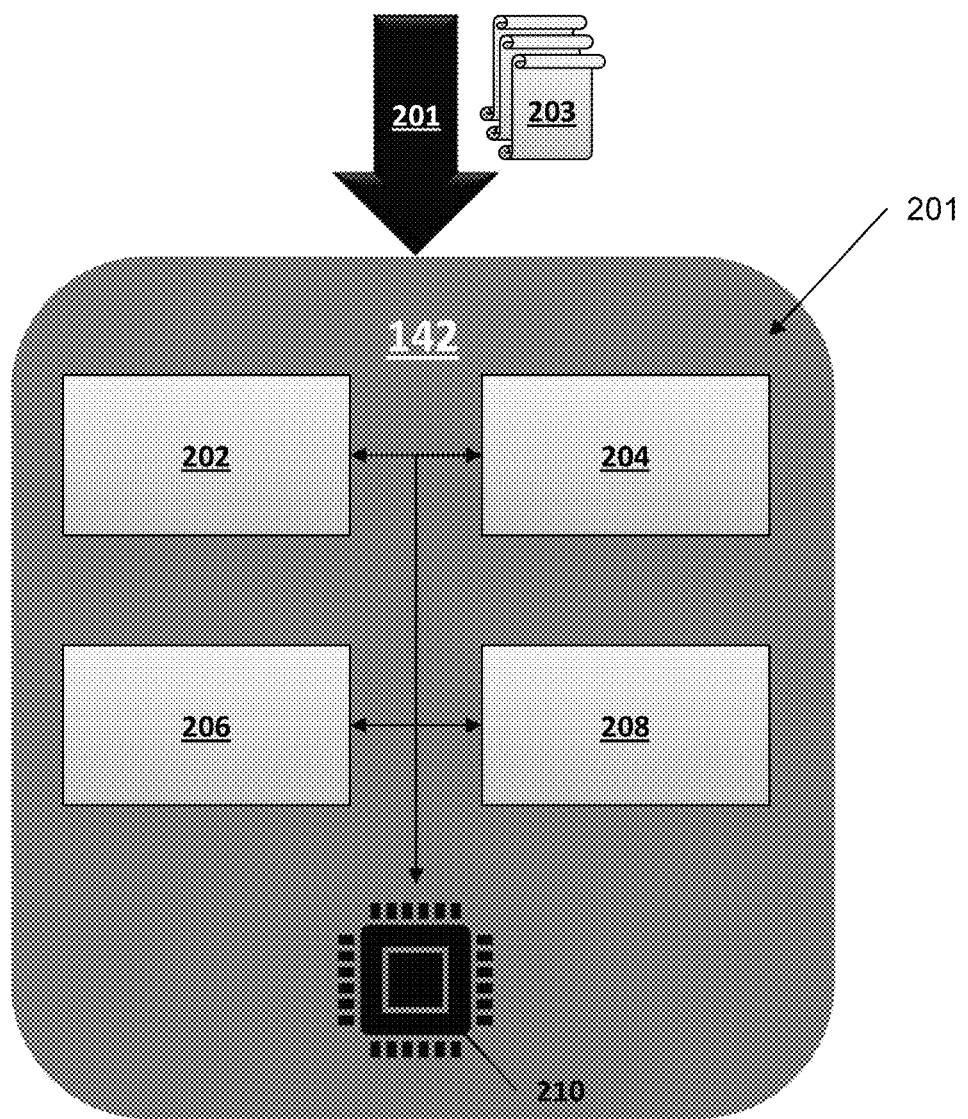
FIG. 2 is a block diagram of a controller in accordance with embodiments of the present disclosure.

Regarding FIG. 2, a controller (e.g., a compression controller) 142 can include logic, circuitry, and hardware 201 that increase the performance of a storage array using activity and compressibility-based data compression.

In embodiments, the controller 142 can include an input/output (IO) processor 202 that analyzes an IO workload 201 received by the storage array 102 of FIG. 1. Specifically, the IO processor 202 can analyze IO metadata from each IO RW request 203 corresponding to the IO workload 201. For example, the IO metadata can include target RW address, IO size, IO type, and the like. Further, the IO processor 202 can identify one or more patterns corresponding to the IO workload 201, or the corresponding IO RW requests 203 based on the historical and current IO workloads. For example, the IO processor 202 can include logic, circuitry, and hardware having neural network architecture that can analyze IO metadata to identify the patterns. Further, the IO processor 202 can maintain a workload patterns log (e.g., a searchable data structure) in local memory 210 that identifies each IO workload's corresponding patterns.

In embodiments, the controller can also include an activity-based compression (ABC) analyzer 204 that generates activity models for each logical device of the storage array 102. The activity models can define a frequency of short-term (ST) and long-term (LT) read/writes targeting each logical device and their corresponding extents, tracks, sectors, or LBAs (e.g., "logical portions") during one or more time windows. For example, a time window can correspond to an interval or a randomly selected duration. Furthermore, an ST or LT read/write can correspond to their corresponding target's half-life. For example, a short-term can correspond to a half-file less than or equal to a first threshold (e.g., 4 hours), and a long-term can correspond to a half-life greater than or equal to a second threshold (e.g., 2 days).

In embodiments, the ABC analyzer 204 can generate one or more ABC score models for each logical device's logical portions targeted by IO RW requests of an IO workload. An ABC score model can define an ABC score for each logical device's logical portions over a duration. For example, the duration can include one or more time windows corresponding to the entire IO workload, one or more intervals of an IO workload, or one or more randomly selected durations of an IO workload. Additionally, the ABC analyzer 204 can compute an ABC score as a function of ST writes, LT writes, or ST reads of each logical device's logical portions. Further, each ABC score model can identify whether a logical device's logical portions corresponding ABC scores exceed an ABC threshold.

In embodiments, the controller 142 can include a compressibility engine 206 that determines the compressibility (e.g., data compression ratio) of targets of IO write requests corresponding to the IO workload 201. Specifically, the compressibility engine 206 can determine the compressibility of each logical device's logical portions. For instance, the compressibility engine 206 can perform an initial software/hardware compression of each logical device's logical portions targeting by the IO write requests. Further, the compressibility engine 206 can limit its initial compression to those logical portions with ABC scores less than the ABC threshold.

In embodiments, the compressibility engine 206 can further generate a compressibility model for each logical device based on the determined compressibility of the IO write request targets. For example, a compressibility model can define each logical portion's data compression ratio, data compression entropy (e.g., variations over time), and the like. Additionally, a compressibility model can define its corresponding logical device's overall compressibility and data compression entropy.

In embodiments, the compressibility engine 206 can determine an overall data reduction performance of the storage array 102 of FIG. 1. For example, the compressibility engine 206 can use historical and current compressibility models of each logical device to determine an observed (e.g., actual) data reduction of the storage array 102. In addition, the compressibility engine 206 can compare the observed data reduction with a data reduction requirement (DRR) of the storage array 102. For example, a service level agreement (SLA) corresponding to the storage array 102 can define the DRR. Based on the comparison, the compressibility engine 206 can maintain a DRR status indicator in the local memory 210.

In addition, the compressibility engine 206 can compare the observed data reduction and DRR to dynamically define and store a compressibility threshold (e.g., data reduction ratio threshold) in the local memory 210. For example, if the observed data reduction is within a hysteresis of the DRR, the compressibility engine 206 can maintain a current compressibility threshold. On the other hand, if the observed data reduction is greater than the DRR and its hysteresis, then the compressibility engine 206 can increase the current compressibility threshold. However, if the observed data reduction is less than the DRR and its hysteresis, the compressibility engine 206 can decrease the current compressibility threshold.

In embodiments, the compressibility engine 206 can maintain a compressibility look-up table (LUT), for each logical device, in the local memory 210. Each logical device's corresponding compressibility LUT can identify each logical portion with a compressibility less than a minimum data reduction ratio. Specifically, the minimum data reduction ratio can correspond to the compressibility threshold. Further, the compressibility engine 206 can identify a compressibility entropy for each logical portion recorded in each compressibility LUT. For example, the compressibility engine 206 can select a sample of future IO writes (e.g., 10%) targeting the logical portion records in each logical device's corresponding compressibility LUT. Further, the compressibility engine 206 can compress the logical portion samples to identify changes in their compressibility.

In addition, the compressibility engine 206 can include logic, circuitry, and hardware designed to perform time-series forecasting (e.g., autoregressive integrated moving average (ARIMA) forecasting). For example, the compressibility engine 206 can forecast the compressibility of each logical portion (e.g., extent) based on their compressibility variations over time. Accordingly, the compressibility engine 206 can also maintain a compressibility prediction model for each logical device based on the compressibility forecasts of their logical portions.

In embodiments, the controller 142 can include a compression processor 208 that can enable software/hardware compression based on the forecasted compressibility or ABS score of an IO write request's target (e.g., a logical portion of a logical device). For example, the compression processor 208 can determine if a record corresponding to the target exists in the compressibility LUT corresponding to the target's logical device. If the record exists, the compression processor 208 can instruct the DA 136 of FIG. 1 to perform an uncompressed write of the IO write request's data payload (e.g., "write data payload"). In embodiments, the compression processor 208 can also determine whether the record's corresponding compressibility entropy indicates that the target's compressibility currently exceeds a threshold compressibility. If the determination is positive, the compression processor 206 can instruct the DA 136 to perform a compressed write of the write data payload.

Further, if a record does not exist, the compression processor 208 can determine if the target's corresponding ABC score exceeds an ABC threshold using the ABC model corresponding to the target's logical device. If the target's ABC score is less than the ABC threshold, the compression processor 208 can instruct the DA 136 to perform a compressed write of the write data payload. Otherwise, the compression processor 208 can instruct the DA 136 to perform an uncompressed write of the data payload.

In embodiments, if the target's ABC score exceeds the ABC threshold, the compression processor 208 can further determine if the DRR of the storage array 102 is satisfied using, e.g., the DRR status indicator stored in the local memory 210. If the DRR is unsatisfied, the compression processor 208 can determine if the target's forecasted compressibility exceeds a compressibility threshold. If the forecasted compressibility exceeds the compressibility threshold, the compression processor 208 can instruct the DA 136 to perform a compressed write of the write data payload. Otherwise, the compression processor 208 can instruct the DA 136 to perform an uncompressed write of the write data payload.

The following text includes details of a method(s) or a flow diagram(s) per embodiments of this disclosure. For simplicity of explanation, each method is depicted and described as a set of alterable operations. Additionally, one or more operations can be performed in parallel, concurrently, or in a different sequence. Further, not all the illustrated operations are required to implement each method described by this disclosure.

Figure 3:
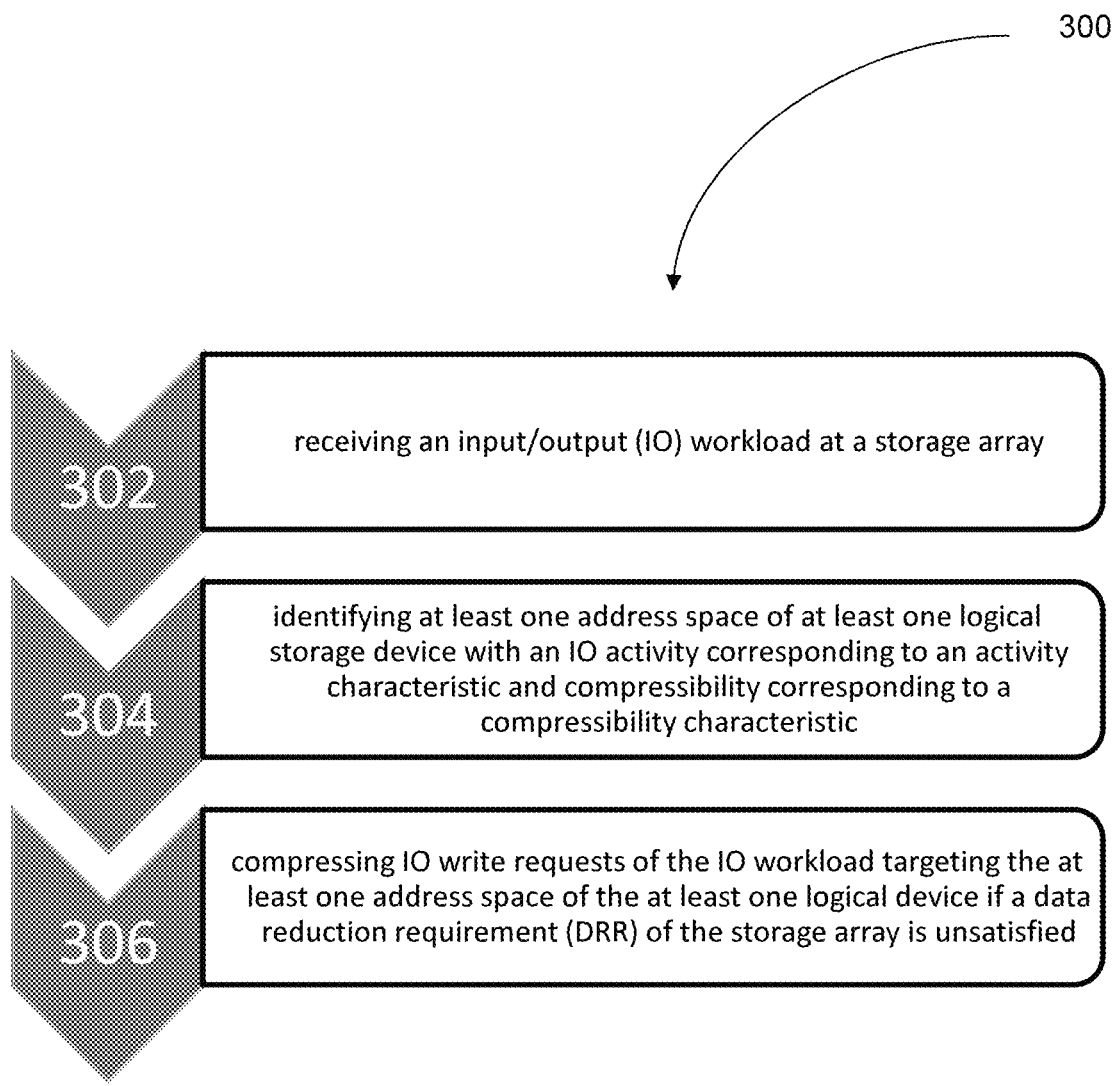
FIG. 3 is a flow diagram of a method for increasing the performance of a storage array using activity and compressibility-based data compression per embodiments of the present disclosure.

Regarding FIG. 3 a method 300 relates to increasing the performance of a storage array using activity and compressibility-based data compression. In embodiments, the controller 142 of FIG. 1 can perform all or a subset of operations corresponding to the method 300.

For example, the method 300, at 302, can include receiving an input/output (IO) workload at a storage array. Additionally, at 304, the method 300 can include identifying at least one address space of at least one logical storage device with an IO activity corresponding to an activity characteristic and compressibility corresponding to a compressibility characteristic. Further, the method 300, at 306, can include compressing IO write requests of the IO workload targeting the at least one address space of the at least one logical device if a data reduction requirement (DRR) of the storage array is unsatisfied.

Further, each operation can include any combination of techniques implemented by the embodiments described herein. Additionally, one or more of the storage array's components 108 can implement one or more of the operations of each method described above.

Figure 4:
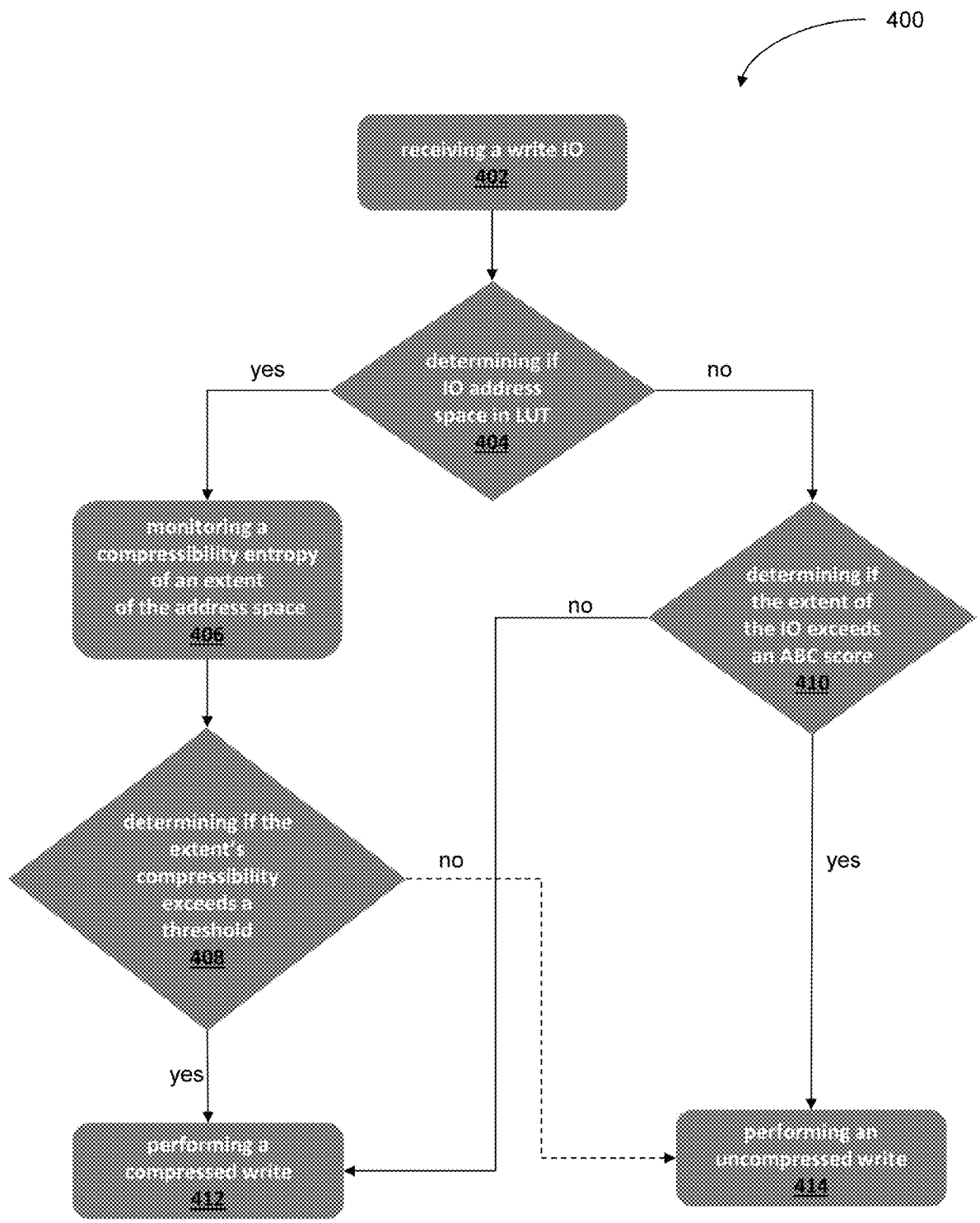
FIG. 4 is a flow diagram of a method for performing activity and compressibility-based data compression per embodiments of the present disclosure.

Regarding FIG. 4, a method 400 relates to performing activity and compressibility-based data compression. In embodiments, the controller 142 of FIG. 1 can perform all or a subset of operations corresponding to the method 400.

For example, the method 400, at 402, can include receiving a write input/output (IO) request at a storage array. Additionally, at 404, the method 400 can include determining if an IO address space corresponding to the write IO request is in a searchable look-up table (LUT). If, at 404, the address space or its corresponding extent is in the LUT, the method 400, at 406, can include monitoring a compressibility entropy of the extent. Further, at 408, the method 400 can include determining if the extent's compressibility exceeds a threshold. If the compressibility exceeds the threshold, the method 400, at 413, can include performing a compressed write of the write IO request's data payload. Otherwise, the method 400, at 414, can include performing an uncompressed write of the write IO request's data payload.

Further, at 404, if the address or its corresponding extent is not in the LUT, the method 400, at 410, can include determining if the address space's corresponding extent exceeds an ABC score. If the extent exceeds the ABC score, the method 400, at 414, can include performing an uncompressed write of the write IO request's data payload. Otherwise, the method 400, at 412, can include performing a compressed write of the write IO request's data payload.

Further, each operation can include any combination of techniques implemented by the embodiments described herein. Additionally, one or more of the storage array's components 108 can implement one or more of the operations of each method described above.

Using the teachings disclosed herein, a skilled artisan can implement the above-described systems and methods in digital electronic circuitry, computer hardware, firmware, or software. The implementation can be a computer program product. Additionally, the implementation can include a machine-readable storage device for execution by or to control the operation of a data processing apparatus. The implementation can, for example, be a programmable processor, a computer, or multiple computers.

A computer program can be in any programming language, including compiled or interpreted languages. The computer program can have any deployed form, including a stand-alone program, subroutine, element, or other units suitable for a computing environment. One or more computers can execute a deployed computer program.

One or more programmable processors can perform the method steps by executing a computer program to perform the concepts described herein by operating on input data and generating output. An apparatus can also perform the method steps. The apparatus can be a special-purpose logic circuitry. For example, the circuitry is an FPGA (field-programmable gate array) or an ASIC (application-specific integrated circuit). Subroutines and software agents can refer to portions of the computer program, the processor, the special circuitry, software, or hardware that implements that functionality.

Processors suitable for executing a computer program include, by way of example, both general and special purpose microprocessors and any one or more processors of any digital computer. A processor can receive instructions and data from a read-only memory, a random-access memory, or both. Thus, for example, a computer's essential elements are a processor for executing instructions and one or more memory devices for storing instructions and data. Additionally, a computer can receive data from or transfer data to one or more mass storage device(s) for storing data (e.g., magnetic, magneto-optical disks, solid-state drives (SSDs, or optical disks).

Data transmission and instructions can also occur over a communications network. Information carriers that embody computer program instructions and data include all nonvolatile memory forms, including semiconductor memory devices. The information carriers can, for example, be EPROM, EEPROM, flash memory devices, magnetic disks, internal hard disks, removable disks, magneto-optical disks, CD-ROM, or DVD-ROM disks. In addition, the processor and the memory can be supplemented by or incorporated into special-purpose logic circuitry.

A computer having a display device that enables user interaction can implement the above-described techniques, such as a display, keyboard, mouse, or any other input/output peripheral. The display device can, for example, be a cathode ray tube (CRT) or a liquid crystal display (LCD) monitor. The user can provide input to the computer (e.g., interact with a user interface element). In addition, other kinds of devices can enable user interaction. Other devices can, for example, be feedback provided to the user in any form of sensory feedback (e.g., visual feedback, auditory feedback, or tactile feedback). Input from the user can, for example, be in any form, including acoustic, speech, or tactile input.

A distributed computing system with a back-end component can also implement the above-described techniques. The back-end component can, for example, be a data server, a middleware component, or an application server. Further, a distributing computing system with a front-end component can implement the above-described techniques. The front-end component can, for example, be a client computer having a graphical user interface, a Web browser through which a user can interact with an example implementation, or other graphical user interfaces for a transmitting device. Finally, the system's components can interconnect using any form or medium of digital data communication (e.g., a communication network). Examples of communication network(s) include a local area network (LAN), a wide area network (WAN), the Internet, a wired network(s), or a wireless network(s).

The system can include a client(s) and server(s). The client and server (e.g., a remote server) can interact through a communication network. For example, a client-and-server relationship can arise by computer programs running on the respective computers and having a client-server relationship. Further, the system can include a storage array(s) that delivers distributed storage services to the client(s) or server(s).

Packet-based network(s) can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), 802.11 network(s), 802.16 network(s), general packet radio service (GPRS) network, HiperLAN), or other packet-based networks. Circuit-based network(s) can include, for example, a public switched telephone network (PSTN), a private branch exchange (PBX), a wireless network, or other circuit-based networks. Finally, wireless network(s) can include RAN, Bluetooth, code-division multiple access (CDMA) networks, time division multiple access (TDMA) networks, and global systems for mobile communications (GSM) networks.

The transmitting device can include, for example, a computer, a computer with a browser device, a telephone, an IP phone, a mobile device (e.g., cellular phone, personal digital assistant (PDA) device, laptop computer, electronic mail device), or other communication devices. The browser device includes, for example, a computer (e.g., desktop computer, laptop computer) with a world wide web browser (e.g., Microsoft® Internet Explorer® and Mozilla®). The mobile computing device includes, for example, a Blackberry®.

Comprise, include, or plural forms of each are open-ended, include the listed parts, and contain additional unlisted elements. Unless explicitly disclaimed, the term 'or' is open-ended and includes one or more of the listed parts, items, elements, and combinations thereof.

What is claimed is:

1. A method comprising:
receiving an input/output (IO) workload at a storage array;
identifying at least one address space of at least one logical storage device with an IO activity corresponding to an activity characteristic and compressibility corresponding to a compressibility characteristic; and
compressing IO write requests of the IO workload targeting the at least one address space of the at least one logical device if a data reduction requirement (DRR) of the storage array is unsatisfied, wherein compressing the IO write requests includes:
determining a compressibility of each extent corresponding to the at least one address space, and
monitoring a compressibility entropy of each extent with a compressibility less than a dynamic compressibility threshold.

2. The method of claim 1, further comprising:
determining if an observed DRR is greater than or less than the DRR; and
dynamically increasing or decreasing a dynamic compressibility threshold based on whether the observed DRR is greater than or less than the DRR.

3. The method of claim 1, further comprising:
grouping the targets according to their corresponding extents, wherein each extent defines a logical grouping of the at least one address space of the at least one logical storage device.

4. The method of claim 3, further comprising:
monitoring an IO activity of each extent; and
providing each extent with an IO activity score based on their respective IO activities.

5. The method of claim 4, further comprising:
dynamically establishing an IO activity threshold based on the IO activity scores of each extent.

6. The method of claim 5, wherein monitoring the compressibility entropy of each extent, includes:
compressing a sample of IO write requests targeting each extent with the compressibility less than a dynamic compressibility threshold.

7. The method of claim 6, further comprising:
maintaining a searchable compressibility data structure identifying each extent with a current compressibility less than the dynamic compressibility threshold; and
maintaining a searchable activity score data structure identifying each extent with a current activity score exceeding a dynamic activity score threshold.

8. The method of claim 7, further comprising:
generating at least one compressibility forecast for each extent based on their individual compressibility variations over time.

9. The method of claim 8, further comprising:
compressing each IO write request targeting extents with a current IO activity score less than the IO activity threshold and a current compressibility greater than the dynamic compressibility threshold; and
compressing each IO write request targeting extents with a current IO activity score greater than the IO activity threshold and a current compressibility greater than the dynamic compressibility threshold if the DRR of the storage array is unsatisfied.

10. A system with a processor and memory, the system configured to:
receive an input/output (IO) workload at a storage array;
identify at least one address space of at least one logical storage device with an IO activity corresponding to an activity characteristic and compressibility corresponding to a compressibility characteristic; and
compress IO write requests of the IO workload targeting the at least one address space of the at least one logical device if a data reduction requirement (DRR) of the storage array is unsatisfied, wherein compressing the IO write requests includes:
determining a compressibility of each extent corresponding to the at least one address space, and
monitoring a compressibility entropy of each extent with a compressibility less than a dynamic compressibility threshold.

11. The system of claim 10, further configured to:
determine if an observed DRR is greater than or less than the DRR; and
dynamically increase or decrease a dynamic compressibility threshold based on whether the observed DRR is greater than or less than the DRR.

12. The system of claim 10, further configured to:
group the targets according to their corresponding extents, wherein each extent defines a logical grouping of the at least one address space of the at least one logical storage device.

13. The system of claim 12, further configured to:
monitor an IO activity of each extent; and
provide each extent with an IO activity score based on their respective IO activities.

14. The system of claim 13, further configured to:
dynamically establish an IO activity threshold based on the IO activity scores of each extent.

15. The system of claim 14, further configured to:
compress a sample of IO write requests targeting each extent with the compressibility less than a dynamic compressibility threshold.

16. The system of claim 15, further configured to:
maintain a searchable compressibility data structure identifying each extent with a current compressibility less than the dynamic compressibility threshold; and
maintain a searchable activity score data structure identifying each extent with a current activity score exceeding a dynamic activity score threshold.

17. The system of claim 16, further configured to:
generate at least one compressibility forecast for each extent based on their individual compressibility variations over time.

18. The system of claim 17, further configured to:
compress each IO write request targeting extents with a current IO activity score less than the IO activity threshold and a current compressibility greater than the dynamic compressibility threshold; and
compress each IO write request targeting extents with a current IO activity score greater than the IO activity threshold and a current compressibility greater than the dynamic compressibility threshold if the DRR of the storage array is unsatisfied.

* * * * *